US012647971B2

(12) United States Patent
Jiang

(10) Patent No.: US 12,647,971 B2
(45) Date of Patent: Jun. 2, 2026

(54) SCHEDULING REQUEST TRIGGERING METHOD

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 328 days.

(21) Appl. No.: 18/284,480

(22) PCT Filed: Apr. 1, 2021

(86) PCT No.: PCT/CN2021/085124

§ 371 (c)(1),
(2) Date: Sep. 27, 2023

(87) PCT Pub. No.: WO2022/205382

PCT Pub. Date: Oct. 6, 2022

(65) Prior Publication Data

US 2024/0373419 A1 Nov. 7, 2024

(51) Int. Cl.
H04W 4/00 (2018.01)
H04W 56/00 (2009.01)
(Continued)

(52) U.S. Cl.
CPC ... H04W 72/1268 (2013.01); H04W 56/0045 (2013.01); H04W 72/566 (2023.01)

(58) Field of Classification Search
USPC .................................................. 370/329, 330
See application file for complete search history.

(56) References Cited

U.S. PATENT DOCUMENTS 11,736,986 B2 * 8/2023 Kung .................... H04W 36/04
370/331
12,446,036 B2 * 10/2025 Sedin .................... H04W 72/23
(Continued)

FOREIGN PATENT DOCUMENTS

| CN | 107733507 A | 2/2018 |
| CN | 107278379 A | 10/2020 |
| EP | 3282632 A1 | 2/2018 |

OTHER PUBLICATIONS

European Patent Application No. 21934039.5, partial Search and Opinion dated Jun. 26, 2024, 17 pages.
(Continued)

*Primary Examiner* — Chuong T Ho
(74) *Attorney, Agent, or Firm* — Cozen O'Connor

(57) ABSTRACT

A method for triggering a scheduling request includes: triggering timing advance (TA) reporting in response to a current condition satisfying a triggering condition; and triggering the scheduling request in response to no available resource for transmitting a TA report. A method for determining a priority includes: determining a logical channel priority of the TA report to be transmitted. A method for transmitting information includes: determining whether to transmit the TA report based on a current state of a discontinuous reception (DRX) in response to triggering the TA reporting. A method for transmitting information includes: transmitting the TA report via available bits in response to the available bits for bearing the TA report existing in current uplink transmission.

20 Claims, 4 Drawing Sheets

S101 triggering timing advance (TA) reporting in response to a current condition satisfying a triggering condition

S102 triggering the scheduling request in response to no available resource for reporting the TA

(51) Int. Cl.
  *H04W 72/1268*  (2023.01)
  *H04W 72/566*  (2023.01)

(56)       References Cited

U.S. PATENT DOCUMENTS

| | | | |
|---|---|---|---|
| 2015/0103794 A1 | 4/2015 | Hoshino et al. | |
| 2022/0086780 A1* | 3/2022 | Tsai | H04W 56/006 |
| 2022/0369368 A1* | 11/2022 | Sedin | H04W 72/1268 |
| 2022/0417885 A1* | 12/2022 | Dai | H04W 16/28 |
| 2023/0007608 A1* | 1/2023 | Li | H04B 7/18519 |
| 2023/0138096 A1* | 5/2023 | Zhao | H04W 72/40 |
| | | | 370/329 |
| 2023/0189179 A1* | 6/2023 | Kunt | H04W 56/004 |
| 2023/0276421 A1* | 8/2023 | Yang | H04W 24/08 |
| | | | 370/329 |
| 2023/0397247 A1* | 12/2023 | Jung | H04B 7/18519 |
| 2023/0413131 A1* | 12/2023 | Shrestha | H04W 72/23 |

OTHER PUBLICATIONS

PCT/CN2021/085124, International Search Report dated Nov. 22, 2021, 5 pages.
MEDIATEK "Timing relationship enhancements for NR-NTN" 3GPP TSG RAN WG1 Meeting #102e, R1-2005495, Aug. 2020, 6 pages.

* cited by examiner

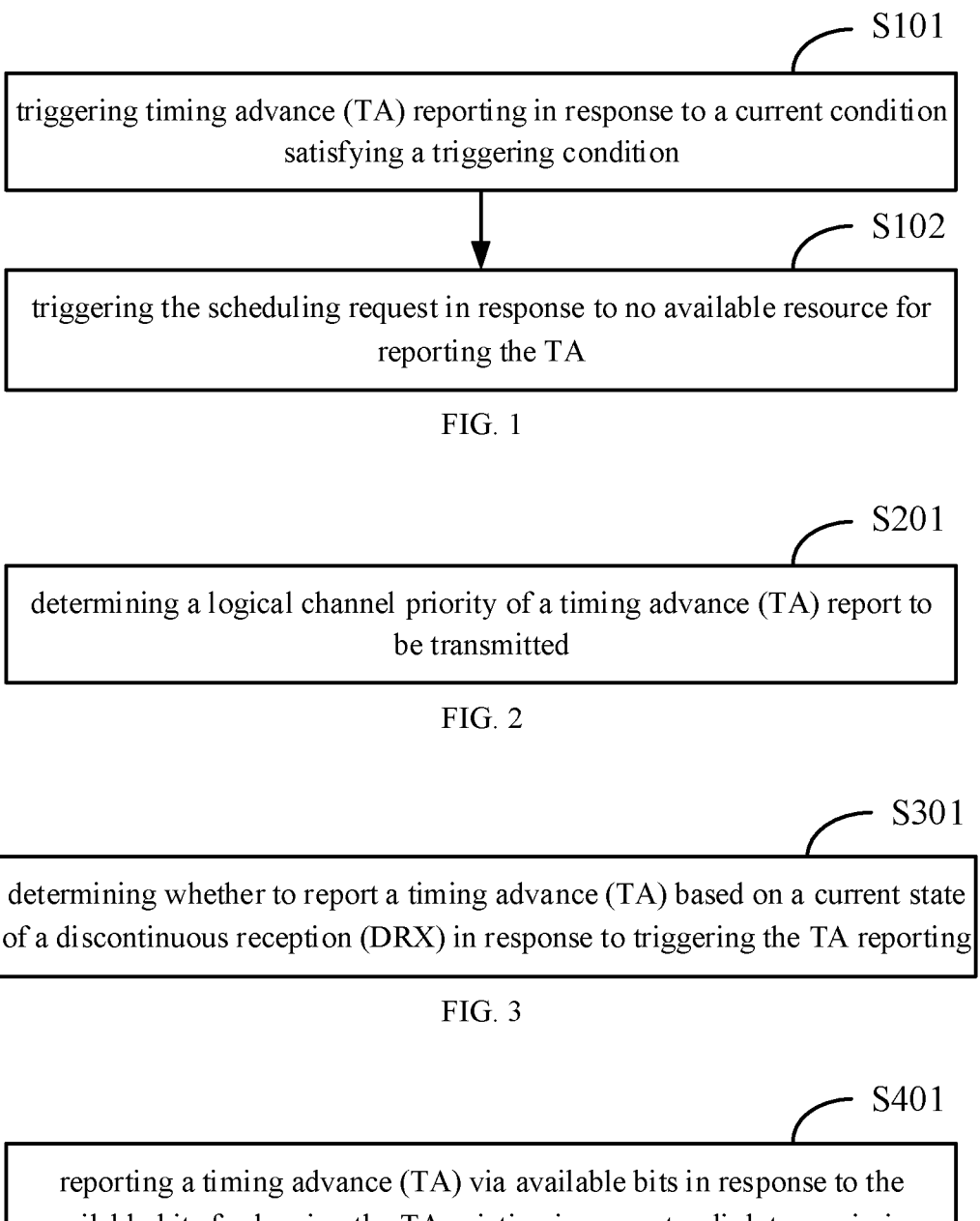

S101 triggering timing advance (TA) reporting in response to a current condition satisfying a triggering condition

S102 triggering the scheduling request in response to no available resource for reporting the TA

FIG. 1

S201 determining a logical channel priority of a timing advance (TA) report to be transmitted

FIG. 2

S301 determining whether to report a timing advance (TA) based on a current state of a discontinuous reception (DRX) in response to triggering the TA reporting

FIG. 3

S401 reporting a timing advance (TA) via available bits in response to the available bits for bearing the TA existing in current uplink transmission

FIG. 4

SCHEDULING REQUEST TRIGGERING METHOD

CROSS-REFERENCE TO RELATED APPLICATIONS

The present application is a National Stage of International Application No. PCT/CN2021/085124, filed on Apr. 1, 2021, the contents of which are incorporated herein by reference for all purposes.

FIELD

The present disclosure relates to the field of mobile communication technology, and particularly to a method and a device for triggering a scheduling request, a method and a device for determining a priority, a method and a device for transmitting information, an electronic device and a computer-readable storage medium.

BACKGROUND

A non-terrestrial network (NTN) is an important technology in mobile communication, which provides a wireless resource using a satellite (or an unmanned aerial vehicle) instead of a terrestrial base station.

The use of a satellite in an NTN may cause a large time delay in the communication between the network and a terminal through the satellite since the satellite moves at a high speed in space so that the distance between the satellite and the terminal may vary greatly during a communication. In order to avoid problems caused by the time delay, the terminal may determine a timing advance (TA) based on a distance between the terminal and the satellite and compensate for the time delay based on the TA.

Due to high-speed movement of the satellite, the TA of the terminal will change frequently. Therefore, the network needs to acquire the TA of the terminal in time to perform relevant processing on the terminal. In view of this, reporting the TA by the terminal becomes an urgent problem to be solved.

SUMMARY

In view of this, embodiments of the present disclosure provide a method and a device for triggering a scheduling request, a method and a device for determining a priority, and a method and a device for transmitting information to solve technical problems in the related technologies.

According to a first aspect of embodiments of the present disclosure, there is provided a method for triggering a scheduling request, including:

triggering timing advance (TA) reporting in response to a current condition satisfying a triggering condition; and triggering the scheduling request in response to no available resource for transmitting a TA report.

According to a second aspect of embodiments of the present disclosure, there is provided a terminal, including:

a processor; and a memory for storing processor-executable instructions;

in which the processor is configured to implement the method for triggering the scheduling request described above.

According to a third aspect of embodiments of the present disclosure, there is provided a non-transitory computer-readable storage medium having a computer program stored thereon that, when executed by a processor, causes steps in the method for triggering the scheduling request to be implemented.

BRIEF DESCRIPTION OF THE DRAWINGS

In order to clearly illustrate technical solutions of embodiments of the present disclosure, a brief description of drawings used for embodiments is given below. The drawings in the following descriptions are only part embodiments of the present disclosure, and for those skilled in the art, other drawings may be obtained according to these drawings without inventive work.

FIG. 1 is a flowchart of a method for triggering a scheduling request according to embodiments of the present disclosure.

FIG. 2 is a flowchart of a method for determining a priority according to embodiments of the present disclosure.

FIG. 3 is a flowchart of a method for transmitting information according to embodiments of the present disclosure.

FIG. 4 is a flowchart of a method for transmitting information according to further embodiments of the present disclosure.

DETAILED DESCRIPTION

Figure 5:
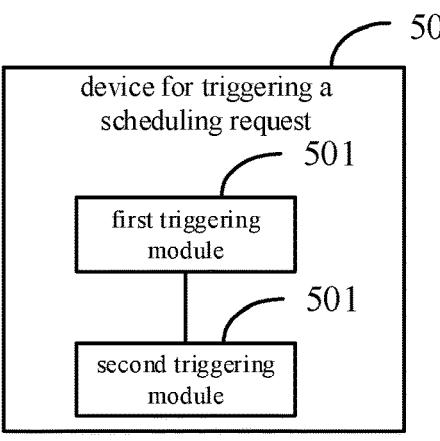
FIG. 5 is a block diagram illustrating a device for triggering a scheduling request according to embodiments of the present disclosure.

Technical solutions in the embodiments of the present disclosure will be described clearly and completely with reference to accompanying drawings in the embodiments of the present disclosure. The embodiments described here are only part of the embodiments of the present disclosure and are not all embodiments of the present disclosure. Based on the embodiments of the present disclosure, other embodiments may be acquired by those skilled in the art without inventive work and are within the scope of the present disclosure.

In a terrestrial network, a base station may configure a timing advance (TA) for a terminal and transmit the TA to the terminal so that the terminal performs uplink synchronization based on the TA. However, in an NTN, a communication delay between the network and the terminal is large, and the TA required by the terminal to perform the uplink synchronization is large, which may exceed a TA range that can be adjusted by the base station. Therefore, the terminal needs to perform a pre-compensation, and the network may adjust the TA based on the pre-compensation of the terminal to achieve the uplink synchronization of the terminal.

In the related art, a method for the terminal to determine the TA pre-compensation may include two methods.

A first method is suitable for a situation where the terminal is capable of locating its own position. Taking a satellite transparent transmission mode as an example, the terminal may calculate a delay to a ground station in a comprehensive consideration of its own position, a position of a satellite reference point, and a delay from a satellite to the ground station. Therefore, the terminal may determine the TA based on the delay and perform the pre-compensation.

A second method is suitable for a situation where the terminal is capable of locating its own position or where a difference among transmission delays from terminals at various positions of a cell to the satellite is small. In the method, the terminal does not need to determine the TA itself, but performs the pre-compensation directly based on a common TA of the network, or the terminal does not perform the pre-compensation but the network compensates with the common TA. The common TA is determined by the network, and is generally determined based on a first time delay from a reference point of the satellite on the ground to the satellite and a second time delay from the satellite to the ground station. For example, the common TA may be twice the sum of the first time delay and the second time delay.

Although a UE may perform the TA pre-compensation based on the above methods at an initial access, a distance between the UE and the satellite will change rapidly due to the high-speed movement of the satellite (for example, low earth orbit (LEO) satellites may have a speed of 7.56 km/s), resulting in a rapid change in the transmission delay between the UE and the satellite. For example, for a satellite altitude of 600 Km, a variation in a round-trip time (RTT) may reach 40 μs/s. However, the TA that may be adjusted by the network is limited, for example, the TA that may be adjusted by the network is shown in Table 1. Therein, a maximum time offset that a TA instruction issued by the network may adjust at a sub-carrier spacing of 240 KHz is 1 μs. This means that the network needs to transmit at least 40 times per second of a TA command when the sub-carrier spacing of 240 KHz is adopted. This incurs significant overhead.

TABLE 1

| μ | Sub-carrier spacing $SCS = 2^{\mu} \cdot 15$ kHz | Maximum timing advance compensated via timing advance command |
|---|---|---|
| 0 | 15 | 0.017 ms |
| 1 | 30 | 0.008 ms |
| 2 | 60 | 0.004 ms |
| 3 | 120 | 0.002 ms |
| 4 | 240 | 0.001 ms |

In the related art, the terminal may determine the TA in the following manner. The network may broadcast a common time offset, or the network may broadcast a time drift rate. The UE calculates TA the according to a formula of TA= $(N_{TA}+N_{TA,offset}[+X])\times T_c[+X]$, where X is obtained according to at least the common time offset broadcast by a system; $N_{TA}$ represents a UE specific TA estimated by the UE itself, which may be determined, for example, based on the first method described above; $N_{TA,offset}$ represents a TA offset defined in 3GPP TS38.213 section 4.2, and $T_C$ represents a parameter defined in 3GPP TS38.211 section 4.1.

It should be noted that X occurs only once in the above formula for calculating the TA, and depending on whether X is used in a form of an offset value of TA or $N_{TA}$, X occurs at either a first position or a second position in the formula. That is, in a case that the form of X is the TA, i.e., a time value (in unit of second, millisecond, etc.), the formula is TA= $(N_{TA}+N_{TA,offset})*T_c+X$, and in a case that the form of X is an offset value of the $N_{TA}$, i.e., a unitless value, the formula is TA= $(N_{TA}+N_{TA,offset}+X)*T_c$.

It should be noted that the TA calculated according to the above formula is not necessarily the TA between the terminal and the ground base station of the satellite. For example, the network compensates for a part of the common time offset, so that the calculated TA does not contain the part compensated by the network.

With the movement of the satellite, the RTT between the UE and the satellite will change continuously, and after updating the UE specific TA estimated by the UE itself, the UE further needs to solve a problem of how to report to the network to let the network to perform scheduling.

In one embodiment, the terminal may determine a terminal-specific TA (i.e., the UE specific TA) based on the RTT between the terminal and a specified reference point, and determine a TA for the pre-compensation according to the UE specific TA. The specified reference point may be the satellite or the reference point corresponding to the satellite.

In one example, the terminal may determine the UE specific TA in various ways. For example, the above-mentioned RTT may be directly taken as the UE specific TA; alternatively, the RTT may be converted first and then used as the UE specific TA, for example, a quotient of RTT/$T_C$ ($T_C$ may be defined by a protocol) may be used as the UE specific TA.

In one embodiment, the TA reported by the terminal may be the above-mentioned UE specific TA, or may be the common TA. The common TA may be determined by the network, and the terminal acquires the common TA from the network. In one example, the common TA may be a round trip delay between the specified reference point (e.g., the satellite, or the reference point corresponding to the satellite) and the base station.

In one embodiment, the TA reported by the terminal may be classified into two types, and the two types of TA are different in size. For convenience of description, the larger TA is referred to as first TA information, and the smaller TA information is referred to as second TA information, and a resource occupied by transmitting the first TA information is greater than a resource occupied by transmitting the second TA information.

In one example, the first TA information may include the UE specific TA and the common TA, and the second TA information may include the UE specific TA.

In another example, the first TA information may include a complete UE specific TA; the second TA information may include a part of bits in the UE specific TA, for example, the second TA information may include several low bits in the UE specific TA. For example, in a case where a frequency of transmitting the TA is high (e.g., higher than a pre-set frequency threshold), a change amount of the UE specific TA is usually not that large, and high bits of the UE specific TA are usually unchanged. Therefore, after transmitting the complete UE specific TA, when the TA reporting is triggered, only a specified number of low bits in the UE specific TA are reported, or only bits in the UE specific TA which have been changed compared with the bits of last reporting of the TA are reported.

In one embodiment, the terminal may only report several high bits in the TA in a case that the TA includes the UE specific TA. For example, regarding the specified number of the low bits in the UE specific TA (for example, the specified number is the same as a number of bits of the common TA), the network may determine the low bits according to a difference value between a moment when the TA reported by the terminal is received and an uplink timer. Therefore, in order to reduce signaling overhead, the terminal may only report high bits that cannot be determined by the network.

In one embodiment, the terminal may perform the TA reporting in various ways, for example, the terminal may report the TA via a media access control (MAC) control element (CE), a physical uplink control channel (PUCCH) or a radio resource control (RRC) message, etc. In one example, the terminal may report the TA in a random access message, for example, the TA may be carried in at least one of random access message A (MsgA), random access message 3 (Msg3), or random access message 5 (Msg5).

In one embodiment, in a case that the TA reporting is triggered multiple times in the terminal, previous triggers may be cancelled after the TA reporting is completed once. For example, in a case that the TA reporting performed by the terminal is triggered multiple times in a time period (such as a T1-T2 period), the terminal does not need to report the TA for every time the TA reporting is triggered in the T1-T2 time period, but may report the TA once, e.g., at a subsequent T3 moment, indicating that the multiple triggers in the T1-T2 period have been completed.

In one embodiment, a dual-connected terminal may report the TA to a master cell group (MCG) and a secondary cell group (SCG) respectively.

In one embodiment, in a case that the terminal accesses multiple serving cells, the terminal may report the TA to each serving cell.

In one embodiment, the terminal may further report time drift rate information of the TA in a case that the terminal performs the TA reporting. For example, the terminal may transmit a TA report carrying the TA and the time drift rate information of the TA to the network while.

In one embodiment, the network may predict a variation of the transmission delay of the terminal according to the time drift rate, so that the network may also predict the transmission delay of the terminal according to the time drift rate in the case where the terminal may not report the TA in time, thus processing terminal information more accurately.

For example, the time drift rate information may be used to indicate a step size of change of the TA per unit time, which may be in units of N frame(s), sub-frame(s), OFDM symbol(s), time slot(s), second(s), millisecond(s), etc., where N is 1, 2, 3 . . . , the step size may be an offset value or a specific time of offset (e.g., microseconds, milliseconds, etc.) relative to the TA.

In one embodiment, when the terminal determines to report the TA, the terminal may also report TA generation time information. For example, the terminal may transmit the TA report carrying the TA and the TA generation time information to the network while. For example, the generation time information may be represented by a system frame number, or may be represented by a system frame number and a sub-frame number, or may be represented by a system frame number, a sub-frame number, and a slot number. Based on this, in one embodiment, the network may determine whether the TA is expired according to the generation time information of the TA.

In one embodiment, the terminal may delay reporting the TA after triggering the TA reporting, and in order to ensure validity of the TA, the terminal may update the TA before transmitting the TA. That is, the terminal may update the TA to be a TA at a current moment after a delay time is reached and report the updated TA. Alternatively, the terminal may update the TA at a pre-set time interval during a delay period, and report the updated TA after the delay time is reached.

For example, in a case that the terminal generates a media access control (MAC) packet data unit (PDU) including the TA, the UE may transmit the MAC PDU after updating the TA in the MAC PDU if the MAC PDU is delayed (for example, because there is a high priority transmission to be transmitted first, or a channel is occupied and is not available).

In one embodiment, the terminal may carry the TA through the TA report.

In one embodiment, the terminal may transmit the TA via a dedicated uplink resource configured by the network. For example, the network may configure a configured grant resource dedicated for the terminal to report the TA.

Other methods related to the TA reporting performed by the terminal in the present disclosure are described below with reference to specific embodiments.

FIG. 1 is a flowchart of a method for triggering a scheduling request according to embodiments of the present disclosure. The method for triggering the scheduling request shown in the embodiments may be applied to a terminal. The terminal includes, but not limited to, an electronic device such as a mobile phone, a tablet computer, a wearable device, a sensor, an Internet of Things device. The terminal may be served as a user equipment (UE) to communicate with a base station including, but not limited to, a 4G base station, a 5G base station, and a 6G base station.

As shown in FIG. 1, the method for triggering the scheduling request includes the following steps.

In S101, timing advance (TA) reporting is triggered in response to a current condition satisfying a triggering condition.

In one embodiment, the TA may be at least one of the UE specific TA and the common TA.

In one embodiment, the terminal may determine to trigger the TA reporting based on whether the triggering condition is currently satisfied. The triggering condition may be preset by the terminal or configured to the terminal by the network.

In one embodiment, the terminal may trigger the TA reporting if it is determined that the current condition satisfies the triggering condition, that is, the terminal determines that the TA reporting is required. In the case where the terminal triggers the TA reporting, the terminal may immediately execute the TA reporting, or may execute the TA reporting in a delayed manner, or may cancel the TA reporting, which is determined according to actual situations.

In one embodiment, the current condition satisfying the triggering condition includes at least one of: a current moment being a moment for periodically reporting; a change amount of a current TA being greater than a threshold value; the current TA requiring to be retransmitted; available bits (also called idle bits) for bearing the TA existing in current uplink transmission; currently receiving a network indication to perform the TA reporting.

In one embodiment, the terminal may periodically perform the TA reporting. In a case that the current moment is the moment for periodically reporting, the terminal may determine that the current condition satisfies the triggering condition and trigger the TA reporting.

In one embodiment, the terminal may trigger the TA reporting based on a specified event.

In one example, the TA reporting is triggered in the case that the terminal determines that the change amount of the current TA is greater than the threshold value, where the threshold value is configured by the network. The change amount of the TA may be a variation between the current TA and the last reported TA. Alternatively, the change amount of the TA may be a drift rate of the TA, such as the change amount of the TA per unit time.

In one example, the TA reporting is triggered in the case that the terminal determines that the current TA needs to be retransmitted. Retransmission of the TA may be a set automatic retransmission of the TA. Alternatively, the terminal may perform retransmission based on feedback of the base station, for example, the terminal may determine that the TA needs to be retransmitted once receiving a message of reception failure fed back by the base station.

In one example, the TA reporting may be triggered in the case that the terminal determines that the available bits for bearing the TA exist in the current uplink transmission, for example, the TA may be carried by the available bits.

In one example, the TA reporting may be triggered in the case that the terminal receives the network indication to perform the TA reporting.

It should be noted that the above triggering conditions are merely exemplary, and other conditions may be included in practical applications, which are not limited here. The terminal may trigger the TA reporting in a case that the above-mentioned one or more triggering conditions are satisfied.

In S102, the scheduling request is triggered in response to no available resource for reporting the TA.

In one embodiment, the terminal may determine if there is a currently available resource in the case the TA reporting is triggered.

In one embodiment, the terminal may perform the TA reporting in a case that there is available uplink resource for reporting the TA; and the terminal may trigger the scheduling request (SR) in a case that there is no available uplink resource for reporting the TA.

According to the above-mentioned embodiments, in the case where the triggering condition is satisfied but there is no available resource, the terminal may trigger the SR to request the network to schedule a resource for reporting the TA. In this way, the terminal may report the TA in time and ensure normal communication between the terminal and the network.

In one embodiment, in the case that there is a resource available, the terminal may report the TA regardless of a type of the TA, for example, whether the TA is a periodic TA or non-periodic TA. Alternatively, the TA reporting may be triggered according to the type of the TA, for example, when the TA is a non-periodic TA, reporting the TA is triggered.

In one embodiment, the terminal may determine to cancel the TA reporting and not trigger the SR in a case that there is no available uplink resource to report the TA. For example, the TA reporting may be cancelled in a case that the TA reporting is periodically reporting the TA.

In one embodiment, the terminal may trigger the SR in a case of no available uplink resource for reporting the TA, to request the network to schedule the uplink resource according to the SR. In this way, the terminal may timely request the network to schedule the uplink resource, guarantee the timeliness of the TA reporting, and avoid expiration of the TA.

In one example, there is no available uplink resource to report the TA, the terminal may trigger the SR for every triggered to-be-reported TA; or, the terminal may trigger the SR only in a case that specified TA reporting is triggered. For example, the SR is not triggered in a case that the TA triggered to be reported is a periodically reported TA. For another example, the SR is triggered in a case that the TA triggered to be reported is a non-periodically reported TA.

In one example, the terminal may trigger the SR in response to no available resource for reporting the TA, and the TA is the non-periodically reported TA.

It should be noted that the non-periodically reported TA is usually triggered by a specified event, and thus the importance thereof is higher than that of the periodically reported TA. Therefore, for the TA with the higher importance, the terminal may request the resource to ensure that the TA is reported to avoid the TA being discarded, and for the TA with the lower importance, the terminal may not request the resource to report the TA.

In one embodiment, it may be determined by a terminal configured with a discontinuous reception (DRX) whether to trigger the TA reporting according to a state of the DRX in which the terminal is currently in.

In one example, the terminal performs the TA reporting in the delayed manner in response to being in an inactive state of the DRX (i.e., DRX OFF) in a case that the current condition satisfies the triggering condition. For example, the terminal may delay the TA reporting until the terminal is switched into an active state of the DRX (i.e., DRX ON). In one example, the terminal may report the TA in response to entering the active state of the DRX from the inactive state of the DRX.

In one example, the terminal may directly report the TA in response to being in the active state of the DRX in a case that the current condition satisfies the triggering condition.

According to the above-mentioned embodiments, the terminal reports the TA in the active state of the DRX and does not report the TA in the inactive state of the DRX, thus reducing power consumption for the terminal.

In one embodiment, the terminal may still trigger the TA reporting in a case that the terminal is in the inactive state of the DRX in order to ensure the timeliness of the TA reporting. For example, the terminal may directly report the TA in the case that the terminal is in the inactive state of the DRX.

In one example, in a case that there is no available resource for reporting the TA, the terminal may determine whether to transmit the SR based on the actual situation, for example, based on the type of the TA.

In one example, the terminal may trigger the SR in the delayed manner or not trigger the SR in response to being in the inactive state of the DRX in a case of no available resource for reporting the TA. In one example, the terminal may determine whether to trigger the SR in the delayed manner or not to trigger the SR according to the type of the TA. For example, the terminal determines not to trigger the SR in response to the TA being the periodically reported TA, or the terminal triggers the SR in the delayed manner in response to the TA being the non-periodically reported TA.

In one example, triggering the SR in the delayed manner by the terminal may include the terminal triggering the SR in response to entering the active state of the DRX from the inactive state of the DRX.

Optionally, the terminal may transmit the SR in response to entering the active state of the DRX from the inactive state of the DRX, or may transmit the SR in the delayed manner based on the actual situation, or may cancel triggering the SR, which is determined based on the actual situation, and is not limited in the embodiments of the present disclosure.

It should be noted that the non-periodically reported TA is usually triggered by the specified event, and thus the importance thereof is higher than that of the periodically reported TA. Therefore, for the TA with the higher importance, the terminal may request the resource to ensure that the TA is reported to avoid the TA being discarded, and for the TA with the lower importance, the terminal may not request the resource to report the TA.

FIG. 2 is a flowchart of a method for determining a priority according to embodiments of the present disclosure. The method for determining the priority shown in the present embodiments may be performed by a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 2, the method for determining the priority may include the following step.

In S201, a logical channel priority of a TA to be transmitted is determined.

In one embodiment, the TA may be at least one of a UE specific TA and a common TA.

In one embodiment, the terminal may report the TA via a MAC CE, and the TA may have a corresponding logical channel.

In one embodiment, the terminal may determine the logical channel priority of the TA. In this way, the terminal may allocate the resource to the TA based on the logical channel priority to ensure a reasonable allocation of the resource for the terminal and ensure that important information is transmitted in time.

In one example, the terminal may determine the logical channel priority of the TA based on a logical channel priority of a message in the related art. For example, the terminal may determine the logical channel priority of the TA according to a logical channel priority of a buffer status report (BSR) and/or a beam failure recovery (BFR). For example, it may be determined that the logical channel priority of the TA is higher than or equal to the logical channel priority of the BSR and the logical channel priority of the TA is lower than or equal to the logical channel priority of the BFR.

In one example, the terminal may determine the logical channel priority of the TA based on an indication from the network. For example, the terminal determines that the logical channel priority of the TA is the highest in response to receiving indication information of performing the TA reporting transmitted by the network. It should be noted that the network indicating the TA reporting refers to that the network currently requires the terminal to report the TA. In general, the importance of the TA is relatively high, and thus the logical channel priority thereof may be set to be the highest to ensure that the TA is reported in time.

In one embodiment, for a case that the TA and other information are transmitted with a same uplink resource, the base station may allocate an uplink resource to the TA according to the logical channel priority of the TA and the logical channel priority of the other information.

For example, the terminal may allocate the uplink resource in a priority order from high to low. For example, the terminal may allocate the resource for a logical channel with a high priority first, and then sequentially allocate the resource for logical channels with a low priority until the allocation of all the resource is complete.

Alternatively, the terminal may allocate the amount of the uplink resource based on the priority order from high to low, and the higher the priority, the more the amount of the allocated resource. For example, the amount of the uplink resource allocated by the terminal to the TA is in a positive correlation with the logical channel priority of the TA According to the above-mentioned embodiments, the terminal may allocate the resource to the TA based on the logical channel priority to ensure the reasonable allocation of the resource for the terminal and ensure that the important information is transmitted in time.

FIG. 3 is a flowchart of a method for transmitting information according to embodiments of the present disclosure. The method for transmitting the information shown in the present embodiments may be performed by a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 3, the method for transmitting the information may include the following step.

In S301, it is determined whether to report the TA based on a current state of the DRX in response to triggering the TA reporting.

In one embodiment, the terminal may directly report the TA in response to being currently in the active state of the DRX.

In one embodiment, the terminal may not report the TA or report the TA in the delayed manner in response to being currently in the inactive state of the DRX.

In one embodiment, the terminal reporting the TA in the delayed manner includes: reporting the TA in response to entering the active state of the DRX from the inactive state of the DRX. For example, the terminal triggers the TA reporting in a case that the terminal is in the inactive state of the DRX. For example, in a case that the TA may be reported non-periodically, the terminal may report the TA in the case of entering the active state of the DRX from the inactive state of the DRX, so that the terminal may ensure the timeliness of the TA reporting while reducing the power consumption.

In one embodiment, in a case that the terminal determines to report the TA in the delayed manner, the TA may be updated in a case that the delay time is reached and the updated TA may be reported. In the present disclosure, the TA reporting may be delayed from a moment the terminal being in the inactive state of the DRX to a moment the terminal is in the active state of the DRX, or may be delayed to a specified resource, for example, may be delayed to a resource time requested by the SR.

In one embodiment, reporting the TA in the delayed manner by the terminal includes: updating the TA and reporting updated TA in response to entering the active state of the DRX from the inactive state of the DRX. In this way, the terminal may update the TA as a TA at a current moment and report the updated TA after entering the active state of the DRX.

In one embodiment, the terminal determines not to report the TA in response to being currently in the inactive state of the DRX and the TA is the non-periodically reported TA. It should be noted that, generally, the importance of the periodically reported TA is not high, so that the TA may not be reported in order to reduce the power consumption of the terminal.

In one embodiment, when the terminal is currently in the inactive state of the DRX, the terminal may determine whether to report the TA according to existence of the available resource for reporting the TA.

In one example, the terminal determines to report the TA in response to being currently in the inactive state of the DRX and the available resource existing for reporting the TA. In this way, the terminal may ensure the timeliness of the TA reporting.

In one example, the terminal determines to not trigger the SR or trigger the SR in the delayed manner in response to being currently in the inactive state of the DRX and no available resource existing for reporting the TA. For example, in a case that the terminal determines that the TA triggered to be reported is the periodically reported TA, it is determined that the SR is not triggered; or in a case that the terminal determines that the TA triggered to be reported is the non-periodically reported TA, it is determined to trigger the SR in the delayed manner.

It should be noted that the non-periodically reported TA is usually triggered by the specified event, thus the importance thereof is higher than that of the periodically reported TA. Therefore, for the TA with the higher importance, the terminal may request the resource to ensure that the TA is reported to avoid the TA being discarded, and for the TA with the lower importance, the terminal may not request the resource to report the TA.

In one example, triggering the SR in the delayed manner by the terminal may include triggering the SR in response to entering the active state of the DRX from the inactive state of the DRX. For example, the terminal triggers the TA reporting in a case that the terminal is in the inactive state of the DRX, and the terminal determines that there is no available resource, and then the terminal may trigger the SR after entering the active state of the DRX, to request the network to schedule the uplink resource for the terminal. The terminal may report the TA according to a scheduled resource in a case that the network successfully schedules the resource for the terminal.

In one embodiment, the terminal may further report time drift rate information of the TA in a case that the terminal determines to report the TA.

For example, the time drift rate information may be used to indicate a step size of change of the TA per unit time, which may be in units of N frame(s), sub-frame(s), OFDM symbol(s), time slot(s), second(s), millisecond(s), etc., where N is 1, 2, 3 . . . , the step size may be an offset value or a specific time of offset (e.g., microseconds, milliseconds, etc.) relative to the TA.

In one embodiment, the terminal may further report generation time information of the TA in a case that the terminal determines to report the TA.

For example, the generation time information may be represented by a system frame number, or may be represented by a system frame number and a sub-frame number, or may be represented by a system frame number, a sub-frame number, and a slot number.

In one embodiment, the network may determine whether the TA is expired according to the generation time information of the TA.

FIG. 4 is a flowchart illustrating a method for transmitting information according to further embodiments of the present disclosure. The method for transmitting the information shown in the present embodiments may be performed by a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 4, the method for transmitting the information may include the following step.

In S401, in response to available bits for bearing the TA existing in current uplink transmission, a TA is reported via the available bits.

In one embodiment, the terminal may check whether there are the available bits in the uplink transmission when the terminal performs the uplink transmission, or the terminal may further determine whether the available bits are sufficient for bearing the TA, and if so, the terminal may report the TA via the available bits.

In one embodiment, the TA reported by the terminal may be classified into two types, and the two types of the TA are different in size, that is, different in a number of occupied bits. For example, first TA information or second TA information may be included in TA information (i.e., the TA report), and the first TA information occupies more bits than the second TA information.

In one embodiment, the terminal may determine the TA based on the number of available bits, e.g. may determine whether the TA is the first TA information or the second TA information.

In one example, it is determined that the TA information includes the first TA information in response to the number of the available bits matching the first TA information; or it is determined that the TA information includes the second TA information in response to the number of the available bits matching the second TA information.

For example, it may be determined that the number of available bits matches the first TA information in a case that there are more available bits than bits required by the first TA information; it may be determined that the number of available bits matches the second TA information in a case that the number of available bits is less than the bits required by the first TA information and more than bits required by the second TA information.

In one embodiment, the first TA information includes a terminal-specific TA and a common TA, and the common TA is configured by a network device; and the second TA information includes a terminal-specific TA.

In one embodiment, the first TA information includes the terminal-specific TA; the second TA information includes a part of bits in the terminal specific TA.

Detailed description of the first TA information and the second TA information in the embodiments may be referred to the foregoing embodiments, and will not be described in detail here.

Corresponding to the foregoing embodiments of the method for triggering the scheduling request, the present disclosure further provides a device for triggering a scheduling request in embodiments.

FIG. 5 is a block diagram illustrating a device for triggering a scheduling request according to embodiments of the present disclosure. The device for triggering the scheduling request shown in the present embodiments may be applied to a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 5, the device for triggering the scheduling request may include:

a first triggering module 501, configured to trigger TA reporting in response to a current condition satisfying a triggering condition; and a second triggering module 502, configured to trigger the scheduling request in response to no available resource for reporting the TA.

In one embodiment, the second triggering module 502 is specifically configured to trigger the scheduling request in response to no available resource for reporting the TA and the TA being a non-periodically reported TA.

In one embodiment, the first triggering module 501 is specifically configured to report the TA in a delayed manner in response to being in an inactive state of a DRX in a case that the current condition satisfies the triggering condition.

In one embodiment, the first triggering module 501 is specifically configured to report the TA in response to entering an active state of the DRX from the inactive state of the DRX.

In one embodiment, the second triggering module 502 is specifically configured to trigger the scheduling request in a delayed manner in response to being in an inactive state of a DRX in a case of no available resource for reporting the TA.

In one embodiment, the second triggering module 502 is specifically configured to trigger the scheduling request in the delayed manner in response to being in the inactive state of the DRX in case of no available resource for reporting the TA, and the TA being a non-periodically reported TA.

In one embodiment, the second triggering module 502 is specifically configured to trigger the scheduling request in response to entering an active state of the DRX from the inactive state of the DRX.

In one embodiment, the second triggering module 502 is further configured to transmit the scheduling request in response to entering the active state of the DRX from the inactive state of the DRX.

In one embodiment, the current condition satisfying the triggering condition includes at least one of: a current moment being a moment for periodically reporting; a change amount of a current TA being greater than a threshold value; the current TA requiring to be retransmitted; available bits for bearing the TA existing in current uplink transmission; currently receiving a network indication to perform the TA reporting.

Corresponding to the foregoing embodiments of the method for determining the priority, the present disclosure also provides a device for determining a priority in embodiments.

Figure 6:
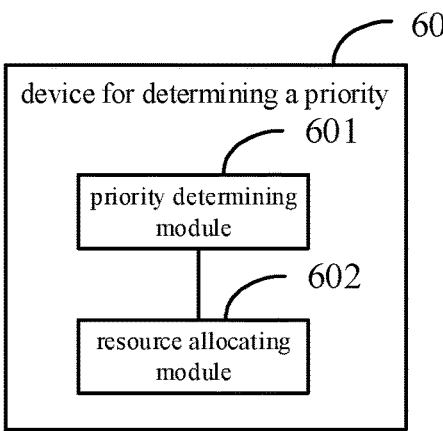
FIG. 6 is a block diagram illustrating a device for determining a priority according to embodiments of the present disclosure.

FIG. 6 is a block diagram illustrating a device for determining a priority according to embodiments of the present disclosure. The device for determining the priority shown in the present embodiments may be applied to a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 6, the device for determining the priority includes:

a priority determining module 601, configured to determine a logical channel priority of a TA report to be transmitted.

In one embodiment, the logical channel priority of the TA report is higher than or equal to a logical channel priority of a BSR; or the logical channel priority of the TA report is lower than or equal to a logical channel priority of a BFR; or determining that the logical channel priority of the TA report is the highest in response to receiving indication information of performing the TA reporting transmitted by a network.

In one embodiment, the device further includes:

a resource allocating module 602, configured to allocate an uplink resource to the TA report based on the logical channel priority of the TA report and logical channel priorities of other information in response to the TA report and the other information being transmitted with a same uplink resource.

In one embodiment, the amount of the uplink resource allocated to the TA report is in a positive correlation with the logical channel priority of the TA report.

Corresponding to the foregoing embodiments of transmitting the information, the present disclosure further provides a device for transmitting information in embodiments.

Figure 7:
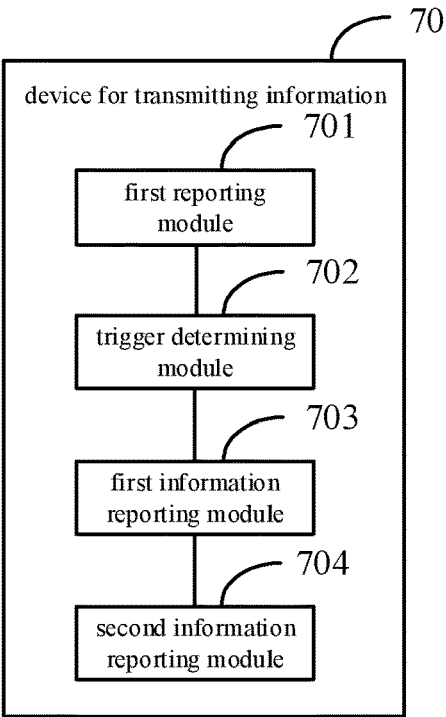
FIG. 7 is a block diagram illustrating a device for transmitting information according to embodiments of the present disclosure.

FIG. 7 is a block diagram illustrating a device for transmitting information according to embodiments of the present disclosure. The device for transmitting the information shown in the present embodiments may be applied to a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 7, the device for transmitting the information includes:

a first reporting module 701, configured to determine whether to report the TA based on the current state being in the inactive state of the DRX in response to triggering the TA reporting.

In one embodiment, the first reporting module 701 is specifically configured to not report the TA or report the TA in the delayed manner in response to being currently in the inactive state of the DRX.

In one embodiment, the first reporting module 701 is specifically configured to report the TA in response to entering the active state of the DRX from the inactive state of the DRX.

In one embodiment, the first reporting module 701 is specifically configured to update the TA and report the updated TA in response to entering the active state of the DRX from the inactive state of the DRX.

In one embodiment, the first reporting module 701 is specifically configured to determine not to report the TA in response to being currently in the inactive state of the DRX and the TA being a non-periodically reported TA.

In one embodiment, the first reporting module 701 is specifically configured to determine to report the TA in response to being currently in the inactive state of the DRX and the available resource existing for reporting the TA.

In one embodiment, the device further includes:

a trigger determining module 702, configured to determine to not trigger a scheduling request or triggering a scheduling request in a delayed manner in response to being currently in the inactive state of the DRX and no available resource existing for reporting the TA.

In one embodiment, the trigger determining module 702 is specifically configured to trigger the scheduling request in response to entering the active state of the DRX from the inactive state of the DRX.

In one embodiment, the trigger determining module 702 is specifically configured to determine not to trigger the scheduling request in response to the TA being a periodically reported TA.

In one embodiment, the device further includes:

a first information reporting module 703, configured to further report time drift rate information of the TA in response to determining to report the TA.

In one embodiment, the device further includes:

a second information reporting module 704, configured to further report generation time information of the TA in response to determining to report the TA.

Corresponding to the foregoing embodiments of the method for transmitting the information, the present disclosure further provides a device for transmitting information in embodiments.

Figure 8:
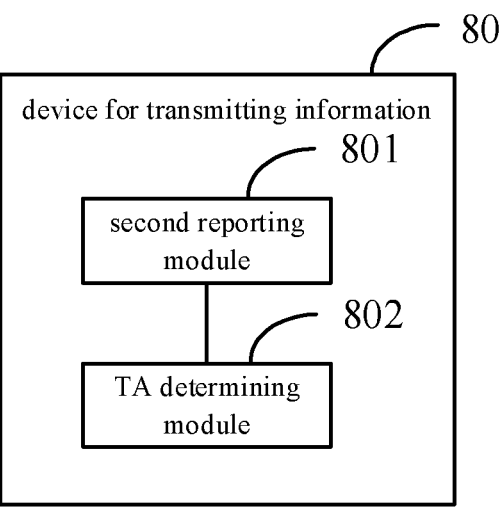
FIG. 8 is a block diagram illustrating a device for transmitting information according to further embodiments of the present disclosure.

FIG. 8 is a block diagram illustrating another device for transmitting information according to embodiments of the present disclosure. The device for transmitting the information shown in the present embodiments may be applied to a terminal including, but not limited to, an electronic device such as a mobile phone, a tablet computer, a wearable device, a sensor, an Internet of Things device. The terminal may be served as a user equipment to communicate with a base station including, but not limited to, a 4G base station, a 5G base station, and a 6G base station.

As shown in FIG. 8, the device for transmitting the information may include:

a second reporting module 801, configured to report the TA via available bits in response to the available bits for bearing the TA existing in current uplink transmission.

In one embodiment, the device further includes:

a TA determining module 802, configured to determine, based on a number of the available bits, the TA information matching the number of the available bits.

In one embodiment, the TA determining module 802 is specifically configured to:

determine that the TA information includes the first TA information in response to the number of the available bits matching the first TA information; or determine that the TA information includes the second TA information in response to the number of the available bits matching the second TA information; where the first TA information occupies more bits than the second TA information.

In one embodiment, the first TA information includes a terminal specific TA and a common TA, the common TA being configured by a network device; and the second TA information includes a terminal specific TA.

In one embodiment, the first TA information includes the terminal specific TA; and the second TA information includes a part of bits in the terminal specific TA.

With respect to the devices in the above embodiments, specific manners for performing operations for individual modules therein have been described in detail in the embodiments regarding the method for triggering the scheduling request, the method for determining the priority and the method for transmitting the information, which will not be elaborated herein.

Since the device embodiments substantially correspond to the method embodiments, reference is made to the partial description of the method embodiments. The above-described device embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. It would be appreciated and executable by those skilled in the art without creative efforts.

Embodiments of methods according to the present disclosure are illustratively described below in connection with specific technical details as follows.

UE acquires a UE specific TA and/or a common TA, and the UE reports the UE specific TA and/or the common TA to the network.

In one embodiment, the UE specific TA represents a RTT from the UE to a reference point (e.g. a satellite) and the common TA represents a RTT from the reference point (e.g. the satellite) to gNB. The UE specific TA reported by the UE may be represented in RTT (time unit: s/ms/us/ns), or $N_{TA}$ may be reported.

In one embodiment, the TA is reported via the MAC CE, PUCCH or RRC message. The TA may be reported in the random access MsgA/Msg3/Msg5.

In one embodiment, the TA reported is a TA report including a long TA report and a short TA report. The long TA report may contain the UE specific TA and the common TA, and the short TA report contains only the UE specific TA. Alternatively, the long TA report contains the entire UE specific TA and the short TA report contains only low bits of the UE specific TA.

In one embodiment, only high bits of the TA are reported in a case that the UE reports the TA report. For example, six low bits of the TA (corresponding to the number of bits of a TA command issued by the network) are not reported, and the network may acquire the six bits by itself based on a difference between a moment when uplink transmission is received and uplink timing.

In one embodiment, once the UE transmits a TA report, all other triggered TA report are cancelled.

In one embodiment, a dual-connected terminal may report the TA to MCG and SCG respectively.

In one embodiment, the UE reports the TA report for each serving cell.

The UE reports the time drift rate information of the TA while reporting the TA.

In one embodiment, the UE reports a time drift rate of the TA of the UE specific TA while reporting the UE specific TA. The time drift rate represents a step size of change of the TA per unit time, which may be in units of N frame(s), sub-frame(s), OFDM symbol(s), time slot(s), second(s), milli-second(s), etc., where N is 1, 2, 3 . . . , and the step size may be an offset value of the TA or the $N_{TA}$ or microseconds/milliseconds, etc.

In one embodiment, the UE triggers reporting the TA report in a case that change in the time drift rate reaches a threshold.

In a case that the UE triggers the TA report, the SR is triggered in a case that there is no available uplink resource to transmit the TA report.

In one embodiment, the TA report is classified into a periodic TA report and a non-periodic TA report. The periodic TA report is a UE TA report triggered periodically, and the non-periodic TA report is a UE TA report triggered by other events, where, for example, a change amount of the TA reaches a threshold, the TA report is retransmitted, additional bits that can be used for bearing the TA report exist in the uplink transmission, or the network instructs the UE to report the TA report.

The SR is triggered only in a case that the triggered TA report is the non-periodic TA report.

In the DRX OFF period, that is, the UE is in a DRX inactive time, the TA report is not triggered or the TA report is delayed until the UE enters the DRX ON period (i.e., the TA report is triggered at that time), or the TA report is triggered but the SR is not triggered, or the SR is triggered but the SR is not transmitted.

In one embodiment, the TA report is not triggered.

In one embodiment, TA report is delayed to be triggered until the UE is in the DRX ON period, that is, the UE is in a DRX active time.

In one embodiment, for the case where the TA report is triggered but the SR is not triggered, it includes triggering the SR in the delayed manner in the DRX ON period.

In one embodiment, for the case where the TA report is triggered but the SR is not triggered, it includes after triggering the SR, transmitting the SR in the delayed manner i.e., until entering into the DRX ON period.

In the DRX OFF period, the SR is not triggered in a case that the triggered TA report is a periodically triggered TA report.

The TA report is transmitted in a case that bits of the uplink resource are enough to carry the TA report. The TA report may be referred to as a padding TA report.

In a case that the TA report includes the long TA report and the short TA report, it is determined whether to transmit the long TA report or the short TA report according to a length of the bits for padding.

The logical channel priority of the TA report is higher than or equal to that of the BSR.

In one embodiment, the TA report is transmitted via the MAC CE, and the TA report will have a corresponding logical channel. The UE allocates the uplink resource based on the logical channel priority, and logical channels with higher priorities are allocated with the uplink resources preferentially until all the uplink resources are allocated.

The logical channel priority of the TA report is lower than or equal to that of the BFR.

The TA report has the highest logical channel priority in a case that the UE is instructed to report the TA report by scheduling information transmitted from the network.

The TA report carries the generation time information of the TA report.

In one embodiment, the generation time information is a system frame number, or a system frame number+a sub-frame number, or a system frame number+a sub-frame number+a slot number.

Only in a case that the change amount of the TA is greater than a threshold, and there is no available uplink resource to transmit the TA report, the triggered TA report will trigger the SR.

The threshold is configured by the network for the UE.

The network configures a dedicated uplink resource for the UE to transmit the TA report. For example, the network configures a dedicated configured grant resource.

In a case that the TA report generated by the UE is transmitted in the delayed manner, the UE may update the TA report before transmitting the TA report.

In one embodiment, the UE generates the MAC PDU containing the TA report. The UE updates the TA report in the MAC PDU before transmitting the MAC PDU in a case that the MAC PDU is transmitted in the delayed manner (for example, because there is a high priority transmission to be transmit first, or the channel is busy and not available at that time).

Embodiments of the present disclosure further provide an electronic device, including: a processor; and a memory for storing processor-executable instructions. The processor is configured to implement the method for triggering the scheduling request, the method for determining the priority and/or the method for transmitting the information.

Embodiments of the present disclosure further provide a computer-readable storage medium having a computer program stored thereon that, when executed by the processor, causes steps in the method for triggering the scheduling request, the method for determining the priority and/or the method for transmitting information to be implemented.

Figure 9:
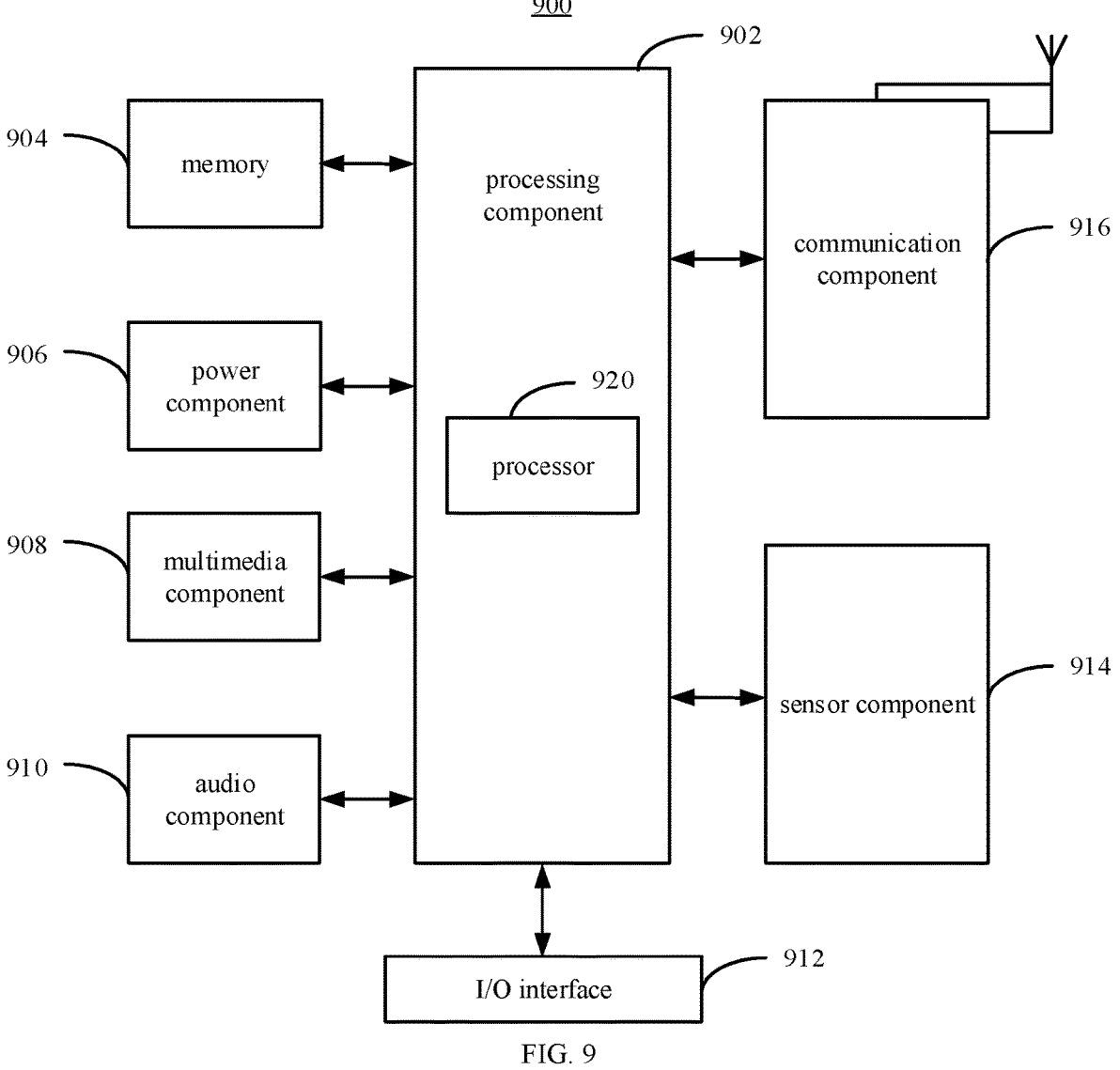
FIG. 9 is a block diagram illustrating a device for triggering a scheduling request, for determining a priority and/or for transmitting information according to embodiments of the present disclosure.

FIG. 9 is a block diagram illustrating a device 900 for triggering a scheduling request, for determining a priority and/or for transmitting information according to embodiments of the present disclosure. For example, the device 900 may be a mobile phone, a computer, a digital broadcast terminal, a messaging device, a game console, a tablet device, a medical device, a fitness device, a personal digital assistant, or the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, phone calls, data communications, camera operations, and recording operations. The processing component 902 can include one or more processors 920 to execute instructions to perform all or some of the steps in the above-described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, videos, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as keyboards, click wheels, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may further include a light sensor, such as a CMOS or CCD image sensor, for use in imaging applications. In some embodiments, the sensor component 914 may further include an accelerometer sensor, a gyroscope sensor, a magnetic sensor, a pressure sensor, or a temperature sensor.

The communication component 916 is configured to facilitate communication, wired or wireless, between the device 900 and other devices. The device 900 can access a wireless network based on a communication standard, such as Wi-Fi, 2G, or 3G, or a combination thereof. In an illustrative embodiment, the communication component 916 receives a broadcast signal or broadcast associated information from an external broadcast management system via a broadcast channel. In an illustrative embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing steps of the network data collection method in the above-mentioned embodiments.

In an illustrative embodiment, there is also provided a non-transitory computer readable storage medium including instructions, such as included in the memory 904, executable by the processor 920 in the device 900, for completing the above-mentioned network data collection method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed herein. This disclosure is intended to cover any variations, uses, or adaptations of the present disclosure following the general principles thereof and including such departures from the present disclosure as come within known or customary practice in the art. It is intended that the specification and examples should be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope of the present disclosure. The scope of the present disclosure only be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a/an . . . " does not exclude the existence of another identical element in the process, method, article or device that includes the element.

The methods and devices provided by the embodiments of the present disclosure have been described in detail above, and specific examples are used to illustrate the principle and implementation of the present disclosure. The description of the above embodiments is only used to help understand the methods and core ideas of the present disclosure. Those skilled in the art can make some changes to specific implementations and applications according to the idea of the present disclosure. Therefore, the content of the description herein should not be construed as a limitation on the present disclosure.

What is claimed is:

1. A method for triggering a scheduling request, comprising:

triggering timing advance (TA) reporting in response to a current condition satisfying a triggering condition; and triggering the scheduling request in response to no available resource for transmitting a TA report wherein the current condition satisfying the triggering condition comprises:

a variation between a current TA report and a last TA report being greater than a threshold value.

2. The method according to claim 1, wherein triggering the scheduling request in response to no available resource for transmitting the TA report comprises:

triggering the scheduling request in response to no available resource for transmitting the TA report and the TA report being a non-periodically transmitted TA report.

3. The method according to claim 1, wherein triggering the TA reporting in response to the current condition satisfying the triggering condition comprises:

transmitting the TA report in a delayed manner in response to being in an inactive state of a discontinuous reception (DRX), and the current condition satisfying the triggering condition;

transmitting the TA report in the delayed manner comprises:

transmitting the TA report in response to entering an active state of the DRX from the inactive state of the DRX.

4. The method according to claim 1, wherein triggering the scheduling request in response to no available resource for transmitting the TA report comprises:

triggering the scheduling request in a delayed manner in response to being in an inactive state of a DRX and no available resource for transmitting the TA report.

5. The method according to claim 1, wherein triggering the scheduling request in response to no available resource for transmitting the TA report comprises:

triggering the scheduling request in the delayed manner in response to being in an inactive state of a DRX, no available resource for transmitting the TA report, and the TA report being a non-periodically transmitted TA report.

6. The method according to claim 1, wherein triggering the scheduling request comprises:

triggering the scheduling request in response to entering an active state of a DRX from an inactive state of the DRX; and transmitting the scheduling request in response to entering the active state of the DRX from the inactive state of the DRX.

7. The method according to claim 1, wherein the current condition satisfying the triggering condition further comprises at least one of:

a current moment being a moment for periodically reporting;

the current TA report requiring to be retransmitted;

available bits for bearing the TA report existing in current uplink transmission; or currently receiving a network indication to perform the TA reporting.

8. The method according to claim 1, further comprising: determining a logical channel priority of the TA report to be transmitted.

9. The method according to claim 8, wherein:

the logical channel priority of the TA report is higher than or equal to a logical channel priority of a buffer status report (BSR); or the logical channel priority of the TA report is lower than or equal to a logical channel priority of a beam failure recovery (BFR).

10. The method according to claim 8, further comprising: allocating an uplink resource to the TA report based on the logical channel priority of the TA report and logical channel priorities of other information in response to the TA report and the other information being transmitted with a same uplink resource.

11. The method according to claim 10, wherein an amount of the uplink resource allocated to the TA report is in a positive correlation with the logical channel priority of the TA report.

12. The method according to claim 8, wherein the logical channel priority of the TA report is determined as the highest in response to receiving indication information of performing the TA reporting transmitted by a network.

13. The method according to claim 1, further comprising: determining whether to transmit the TA report based on a current state of a discontinuous reception (DRX) in response to triggering the TA reporting.

14. The method according to claim 13, wherein determining whether to transmit the TA report based on the current state of the DRX comprises:

not transmitting the TA report or transmitting the TA report in a delayed manner in response to being currently in an inactive state of the DRX.

15. The method according to claim 14, wherein transmitting the TA report in the delayed manner comprises:

transmitting the TA report in response to entering an active state of the DRX from the inactive state of the DRX; or updating the TA report and transmitting the updated TA report in response to entering the active state of the DRX from the inactive state of the DRX.

16. The method according to claim 14, wherein not transmitting the TA report or transmitting the TA report in the delayed manner in response to being currently in the inactive state of the DRX comprises:

determining not to transmit the TA report in response to being currently in the inactive state of the DRX and the TA report being a non-periodically transmitted TA report.

17. The method according to claim 13, further comprising:

further transmitting at least one of time drift rate information and generation time information of the TA report in response to determining to transmit the TA report.

18. The method according to claim 1, further comprising: transmitting the TA report via available bits in response to the available bits for bearing the TA report existing in current uplink transmission;

determining, based on a number of the available bits, TA information matching the number of the available bits, wherein determining that the TA information comprises first TA information in response to the number of the available bits matching the first TA information; or determining that the TA information comprises second TA information in response to the number of the available bits matching the second TA information;

wherein the first TA information occupies more bits than the second TA information.

19. A terminal, comprising:

a processor; and a memory for storing processor-executable instructions;

wherein the processor is configured to implement a method for triggering a scheduling request, comprising:

triggering timing advance (TA) reporting in response to a current condition satisfying a triggering condition; and triggering the scheduling request in response to no available resource for transmitting a TA report;

wherein the current condition satisfying the triggering condition comprises:

a variation between a current TA report and a last TA report being greater than a threshold value.

20. A non-transitory computer-readable storage medium having a computer program stored thereon that, when executed by a processor, implements a method for triggering a scheduling request, comprising:

triggering timing advance (TA) reporting in response to a current condition satisfying a triggering condition; and triggering the scheduling request in response to no available resource for transmitting a TA report;

wherein the current condition satisfying the triggering condition comprises:

a variation between a current TA report and a last TA report being greater than a threshold value.

\* \* \* \* \*